(No Model.)
F. HAARSTICK.
PHOTOGRAPHIC CAMERA.
No. 552,246. Patented Dec. 31, 1895.
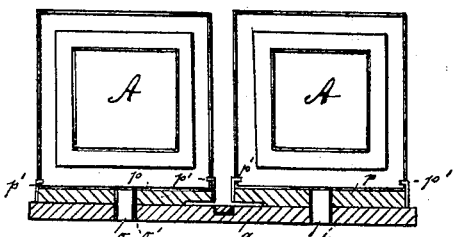
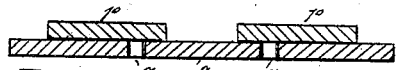
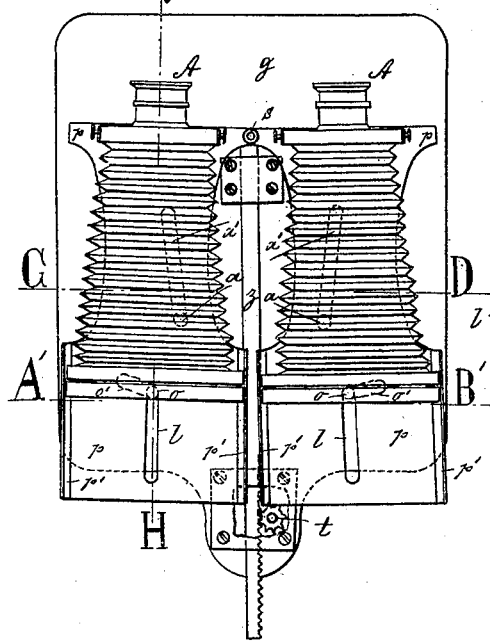
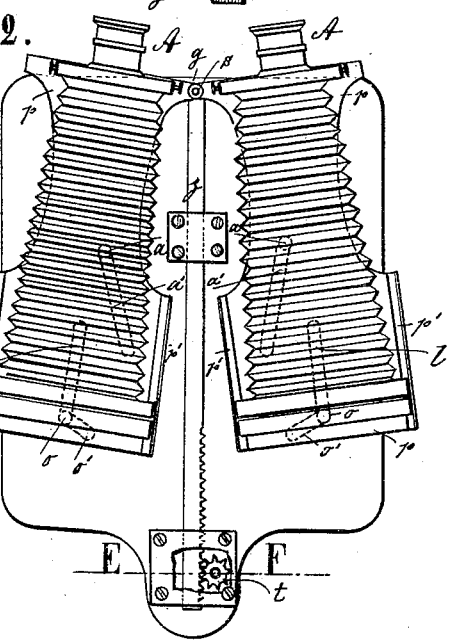
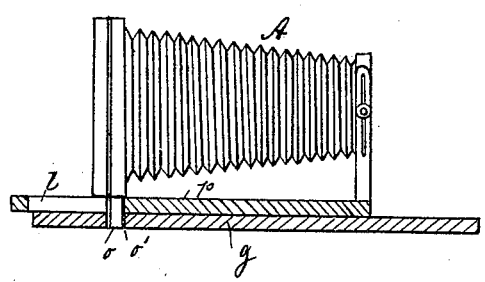
Witnesses
John Becker
William Schulz
Inventor:
Friedrich Haarstick
by his attorneys
Roeder & Briesen

UNITED STATES PATENT OFFICE.

FRIEDRICH HAARSTICK, OF DUSSELDORF, GERMANY.

PHOTOGRAPHIC CAMERA.

SPECIFICATION forming part of Letters Patent No. 552,246, dated December 31, 1895.

Application filed June 1, 1895. Serial No. 551,349. (No model.) Patented in Germany August 21, 1894, No. 81,380.

*To all whom it may concern:*

Be it known that I, FRIEDRICH HAARSTICK, a subject of the German Emperor, residing at Dusseldorf, Germany, have invented certain new and useful Improvements in Photographic Cameras, (for which I have obtained a patent in Germany, No. 81,380, dated August 21, 1894,) of which the following is a specification.

This invention relates to a duplex camera, in which one camera-section is used to focus the object and the other to take the picture. The cameras are pivotally connected, and may be set at any suitable inclination to one another. Thus no matter at what distance the camera is placed from the object the same image will appear in both sections of the camera. One of the cameras is provided with the ground-glass plate and the other with the sensitized plate, and an instantaneous picture may thus be taken at the moment the object is properly focused on the ground plate.

In the accompanying drawings, Figure 1 is a plan of my improved camera, showing it contracted. Fig. 2 is a similar view showing it expanded. Fig. 3 is a cross-section on line A' B', Fig. 1; Fig. 4, a section of part of the camera on line C D, Fig. 1, with the bellows omitted; Fig. 5, a section on line E F, Fig. 2; Fig. 6, a longitudinal section on line G H, Fig. 1.

The letter $g$ represents the base-plate of the two cameras $A$, which are mounted upon slides $p$, connected at their forward end by pivot $s$. To the pivot is secured a rack $z$, engaged by pinion $t$, that may be revolved in suitable manner. The cameras $A$, which are provided with bellows or are made extensible in other manner, are attached at their forward end to the slides $p$, while at their rear end they are movable upon such slides.

From the lower side of the cameras pins $o$ pass through longitudinal guide-slots $l$ of slides $p$ into transverse slots $o'$ of the base-plate $g$, while the rear ends of the cameras are free to slide on guide-rails $p'$ of the slides $p$. In order to cause the cameras to assume the desired inclination toward each other, the base-plate $g$ is provided with converging slots $a'$, that are engaged by pins $a$ of slides $p$.

The operation of the device is as follows: The parts being in the position shown in Fig. 1, the pinion $t$ is revolved to move the slides $p$ forward. During this motion the bellows will expand and the pins $o$ will by engagement with slots $l$ properly guide the cameras upon the slides. At the same time the engagement of the pins $a$ with the inclined slots $a'$ will cause the slides and cameras to swing around upon the pivot $s$, while the pins $o$ will travel along the transverse slots $o'$. The slides will thus diverge while the cameras are being focused, and the apparatus will eventually arrive in an intermediate or the extreme position illustrated in Fig. 2. In this way the inclination of the cameras will always be in exact proportion to the extent to which the bellows have been expanded, and thus both cameras will always be properly focused at the same object at all distances.

What I claim is—

1. The combination of a pair of pivotally connected slides with cameras mounted thereon, a rack and pinion for moving the slides in a longitudinal direction, and a pin and converging grooves for inclining the slides, substantially as specified.

2. The combination of cameras $A$, having pins $o$, $a$, with slides $p$, having grooves $l$, a base plate $g$, having grooves $o'$, $a'$, a rack $z$, and pinion $t$, substantially as specified.

In testimony whereof I have signed this specification in the presence of two subscribing witnesses.

FRIEDRICH HAARSTICK.

Witnesses:
ERNEST ANDRÉ,
WILLIAM ESSENWEIN.